US012046899B2

(12) United States Patent
Sadot et al.

(10) Patent No.: US 12,046,899 B2
(45) Date of Patent: Jul. 23, 2024

(54) SYSTEM AND METHOD FOR OPTIMIZATION OF POWER CONSUMPTION AND POWER STORAGE

(71) Applicant: FORESIGHT ENERGY LTD., Hod HaSharon (IL)

(72) Inventors: Emek Sadot, Ram-On (IL); Evgeny Finkel, Petach-Tikva (IL); Sergei Edelstein, Herzliya (IL); Yuval Farkash, Tel Aviv (IL)

(73) Assignee: FORESIGHT ENERGY LTD., Hod HaSharon (IL)

( * ) Notice: Subject to any disclaimer, the term of this patent is extended or adjusted under 35 U.S.C. 154(b) by 374 days.

(21) Appl. No.: 17/613,372

(22) PCT Filed: May 21, 2020

(86) PCT No.: PCT/IL2020/050564
§ 371 (c)(1),
(2) Date: Nov. 22, 2021

(87) PCT Pub. No.: WO2020/234887
PCT Pub. Date: Nov. 26, 2020

(65) Prior Publication Data
US 2022/0209531 A1 Jun. 30, 2022

Related U.S. Application Data

(60) Provisional application No. 62/851,643, filed on May 23, 2019.

(51) Int. Cl.
*H02J 3/00* (2006.01)
*G06Q 50/06* (2024.01)
(Continued)

(52) U.S. Cl.
CPC .............. *H02J 3/003* (2020.01); *G06Q 50/06* (2013.01); *H02J 3/004* (2020.01); *H02J 3/144* (2020.01);
(Continued)

(58) Field of Classification Search
CPC .. H02J 3/003; H02J 3/004; H02J 3/144; H02J 3/28; H02J 3/381; H02J 2310/12;
(Continued)

(56) References Cited

U.S. PATENT DOCUMENTS 7,274,975 B2   9/2007   Miller
8,364,609 B2   1/2013   Ozog
(Continued)

FOREIGN PATENT DOCUMENTS

EP       2704367      3/2014
KR       20140075614  6/2014
WO       WO 2014/014792  1/2014

OTHER PUBLICATIONS

International Search Report dated Sep. 3, 2020 for corresponding Application No. PCT/IL2020/050564.
(Continued)

*Primary Examiner* — Yuhui R Pan
(74) *Attorney, Agent, or Firm* — Whitestone Law, PLLC (57) ABSTRACT

Systems and methods of managing power distribution in a portion of an electrical power grid with at least one power storage, including: receiving at least one power consumption rule from at least one consumer of the power grid, analyzing power consumption data from at least one power consumption meter connected to the power grid, applying the at least one power consumption rule on the analyzed power consumption data, based on forecasted data, and managing power consumption for the at least one consumer, based on the result of the at least one power consumption rule, and also based on a power capacity status of the at least one power storage.

19 Claims, 5 Drawing Sheets

(51) Int. Cl.
  *H02J 3/14* (2006.01)
  *H02J 3/28* (2006.01)
  *H02J 3/38* (2006.01)
(52) U.S. Cl.
  CPC ............ *H02J 3/28* (2013.01); *H02J 3/381* (2013.01); *H02J 2310/12* (2020.01); *H02J 2310/50* (2020.01)
(58) Field of Classification Search
  CPC ............ H02J 2310/50; H02J 13/00006; H02J 2300/20; H02J 2300/22; H02J 2310/58; H02J 2310/64; G06Q 50/06; G06Q 10/06; Y04S 40/12; Y04S 50/10
  See application file for complete search history.

(56) References Cited

U.S. PATENT DOCUMENTS

| | | | |
|---|---|---|---|
| 2010/0179704 A1* | 7/2010 | Ozog | H02J 7/35 703/2 |
| 2011/0015797 A1 | 1/2011 | Gilstrap | |
| 2012/0004783 A1 | 1/2012 | Lo et al. | |
| 2012/0323382 A1 | 12/2012 | Kamel et al. | |
| 2013/0043725 A1 | 2/2013 | Birkelund | |
| 2017/0148114 A1* | 5/2017 | Liptsey-Rahe | G06Q 50/06 |
| 2018/0144414 A1* | 5/2018 | Lee | H02J 3/32 |
| 2018/0225779 A1 | 8/2018 | Sadot et al. | |

OTHER PUBLICATIONS

NREL Transforming Energy: Home and Building Energy Management Systems; retrieved from the internet on Feb. 18, 2018, https://www.nrel.gov/grid/energy-management.html.

Sajad Ghorbani, et al., Multi-agent Autonomous Decision Making in Smart Micro-Grid's Energy Management: A Decentralized Approach, Conference paper, Jul. 28, 2017, Lecture Notes in Computer Science, vol. 10413, Springer International Publishing AG, Switzerland.

Yong Ding, et al., Sequential Pattern Mining—a Study to Understand Daily Activity Patterns for Load Forecasting Enhancement, Conference paper, Oct. 25, 2015, p. 1-6, IEEE First International Smart Cities Conference (ISC2), Guadalajara, Mexico.

\* cited by examiner

SYSTEM AND METHOD FOR OPTIMIZATION OF POWER CONSUMPTION AND POWER STORAGE

CROSS-REFERENCE TO RELATED APPLICATIONS

This application is a National Phase Application of PCT International Application No. PCT/IL2020/050564, International Filing Date May 21, 2020, claiming the benefit of U.S. Patent Application No. 62/851,643, filed May 23, 2019, all of which are hereby incorporated by reference.

FIELD OF THE INVENTION

The present invention generally relates to electric power systems. More particularly, the present invention relates to systems and methods for optimization of power consumption and/or optimization of power storage.

BACKGROUND OF THE INVENTION

In recent years, power consumption data has become available to providers (e.g. power plants) utilizing "smart" power consumption meters. These power consumption meters are usually directly coupled to a consumer, for instance coupled to a power grid of a private household, such that the power provider may at any time retrieve data from the meters, for instance retrieve power consumption data via a communication network.

While a vast amount of power consumption data is available, there is still a need for a way to manage all of this data to determine power consumption data and/or power production data in electrical power grids.

SUMMARY OF THE INVENTION

There is thus provided, in accordance with some embodiments of the invention, a method of managing power distribution in a portion of an electrical power grid with at least one power storage, including receiving at least one power consumption rule from at least one consumer of the power grid, analyzing power consumption data from at least one power consumption meter connected to the power grid, wherein the received power consumption data corresponds to consumption of the at least one consumer, applying the at least one power consumption rule on the analyzed power consumption data, based on forecasted data, and managing power consumption for the at least one consumer, based on the result of applying the at least one power consumption rule, and also based on a power capacity status of the at least one power storage. In some embodiments, the forecasted data may be selected from the group consisting of: forecasted power consumption, forecasted power production, and forecasted energy prices.

In some embodiments, the operation of power consumption management may be selected from the group consisting of: allocating power resources to the at least one power storage, retrieving power from the power grid, consuming power from the at least one power storage instead of the power grid, and reallocating power resources to a different consumer of the power grid. In some embodiments, management of the power consumption may include consuming power by an electrical appliance connected to the power grid.

In some embodiments, the power grid may include at least one power production facility, and the operation of power consumption management may include at least one of: allocating power resources from the at least one power production facility to the at least one power storage, and allocating power resources from the at least one power production facility to the power grid. In some embodiments, influence of managing power consumption may be analyzed for the at least one consumer on power distribution of the entire power grid, and the at least one power consumption rule may be updated to maintain power distribution of the power grid below a first predefined threshold.

In some embodiments, the first predefined threshold may be based on power consumption data from consumers that are geographically adjacent to the at least one consumer. In some embodiments, the result of the application of the at least one power consumption rule may be calculated based on a machine learning algorithm configured to increase power distribution of the power grid towards a second predefined threshold. In some embodiments, the machine learning algorithm may include a decision tree generated based on a consumer feedback loop.

In some embodiments, the forecasted data may be analyzed to calculate at least one possible scenario, at least one action plan may be determined for each calculated scenario, at least one action strategy may be determined for each determined action plan, and a single optimal scenario may be determined based on the determined at least one action strategy.

In some embodiments, the at least one action plan may be deterministic. In some embodiments, the at least one action strategy may be conditional. In some embodiments, the single optimal scenario may be determined based on the at least one power consumption rule. In some embodiments, the single optimal scenario may be determined based on at least one of: hidden Markov model and a Monte-Carlo evaluator.

There is thus provided, in accordance with some embodiments of the invention, a system for managing power distribution in an electrical power grid with at least one power storage, including at least one power consumption meter connected to the power grid, and a processor, coupled to the at least one power consumption meter, and configured to: receive at least one power consumption rule from at least one consumer of the power grid, analyze power consumption data from at least one power consumption meter, wherein the received power consumption data corresponds to consumption of the at least one consumer, apply the at least one power consumption rule on the analyzed power consumption data, based on forecasted data, and manage power consumption for the at least one consumer, based on the result of the application of the at least one power consumption rule, and also based on a power capacity status of the at least one power storage. In some embodiments, the forecasted data may be selected from the group consisting of: forecasted power consumption. forecasted power production, and forecasted energy prices.

In some embodiments, for the operation of power consumption management the processor may be configured to carry out at least one of: allocate power resources to the at least one power storage, retrieve power from the power grid, consume power from the at least one power storage instead of the power grid, and reallocate power resources to a different consumer of the power grid.

In some embodiments, the power grid may include at least one power production facility, and for the operation of power consumption management the processor may be configured to carry out at least one of: allocate power resources from the at least one power production facility to the at least one power storage, and allocate power resources from the at least one power production facility to the power grid.

There is thus provided, in accordance with some embodiments of the invention, a method of managing power distribution of at least one electrical power production facility coupled to at least one power storage, including receiving at least one power consumption rule from at least one consumer of the at least one electrical power production facility, analyzing power consumption data from at least one power consumption meter connected to the at least one electrical power production facility, wherein the received power consumption data corresponds to consumption of the at least one consumer, applying the at least one power consumption rule on the analyzed power consumption data, based on forecasted data, and managing power consumption for the at least one consumer, based on the result of the application of the at least one power consumption rule, and also based on a power capacity status of the at least one power storage. In some embodiments, the forecasted data may be selected from the group consisting of: forecasted power consumption. forecasted power production, and forecasted energy prices.

In some embodiments, the operation of power consumption management may be selected from the group consisting of: allocating power resources from the at least one power production facility to the at least one power storage, consuming power from the at least one power storage, and reallocating power resources to a different consumer of the power grid.

In some embodiments, the forecasted data may be analyzed to calculate at least one possible scenario, at least one action plan may be determined for each calculated scenario, at least one action strategy may be determined for each determined action plan, and a single optimal scenario may be determined based on the determined at least one action strategy.

In some embodiments, the at least one action plan may be deterministic. In some embodiments, the at least one action strategy may be conditional. In some embodiments, the single optimal scenario may be determined based on the at least one power consumption rule. In some embodiments, the single optimal scenario may be determined based on at least one of hidden Markov model and a Monte-Carlo evaluator.

There is thus provided, in accordance with some embodiments of the invention, a system for managing power distribution in an electrical power grid with at least one power production facility coupled to at least one power storage, including at least one power production meter connected to the at least one power production facility, and a processor, coupled to the at least one power production meter, and configured to: receive at least one power production rule from at least one consumer of the power grid, analyze power production data from at least one power production meter, wherein the received power production data corresponds to production of the at least one power production facility, apply the at least one power production rule on the analyzed power production data, based on forecasted data, and manage power consumption for the at least one power storage, based on the result of the application of the at least one power production rule, and also based on a power capacity status of the at least one power storage. In some embodiments, the forecasted data may be selected from the group consisting of: forecasted power consumption. forecasted power production, and forecasted energy prices.

In some embodiments, for the operation of power consumption management the processor may be configured to carry out at least one of: allocate power resources from the at least one power production facility to the at least one power storage, allocate power resources to the at least one power storage from the power grid, allocate power resources from the at least one power production facility to the power grid, and reallocate power resources to a different consumer of the power grid.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Figure 1:
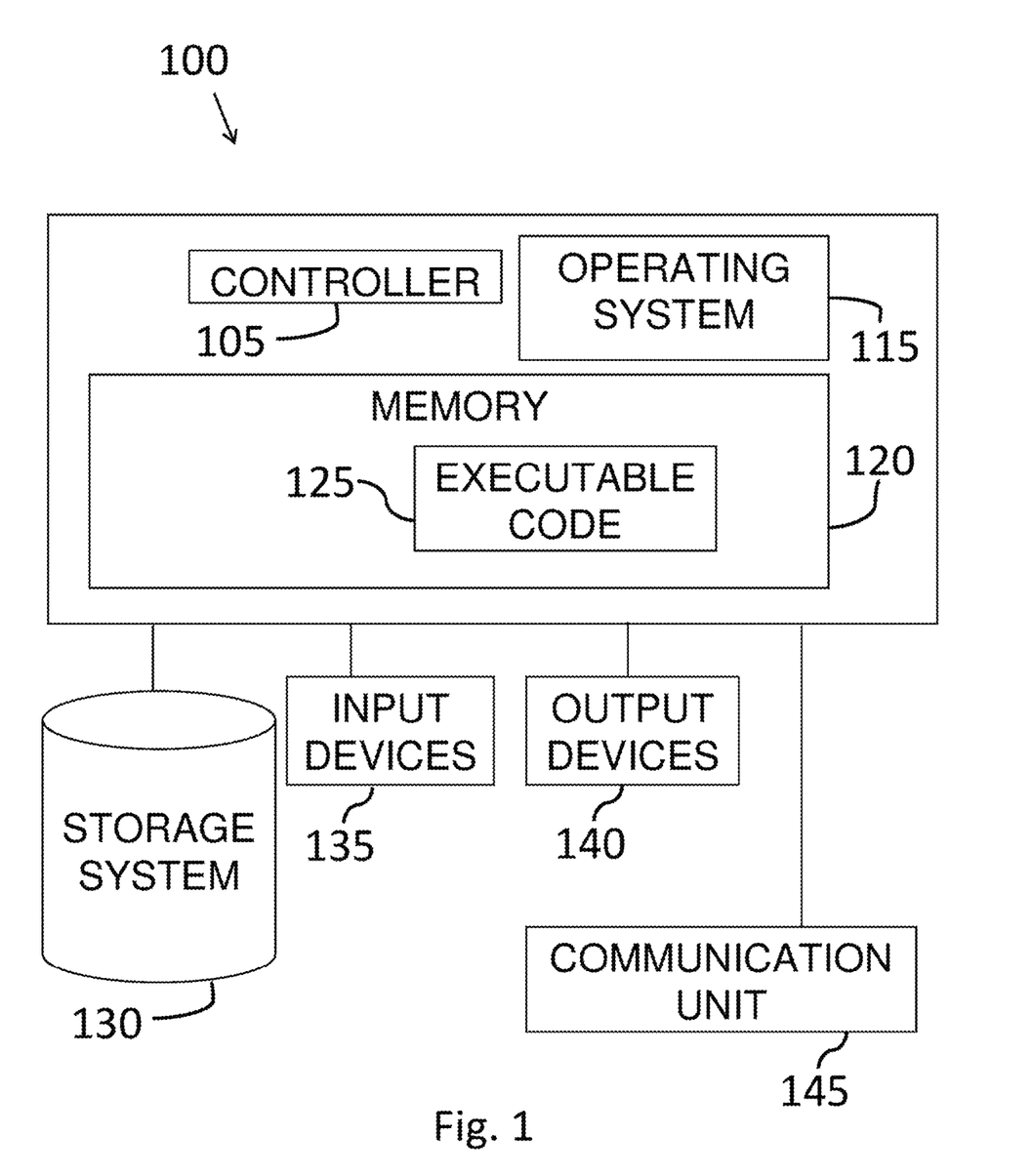
FIG. 1 shows a block diagram of an exemplary computing device, according to some embodiments of the invention.

Reference is made to FIG. 1, which is a schematic block diagram of an example of a computing device, according to some embodiments of the invention. Computing device 100 may include a controller or processor 105 (e.g., a central processing unit processor (CPU), a graphics processing unit (GPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. The system described herein may include one or more computing device(s) 100.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPU), GPUs, or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device.

Figure 2A:
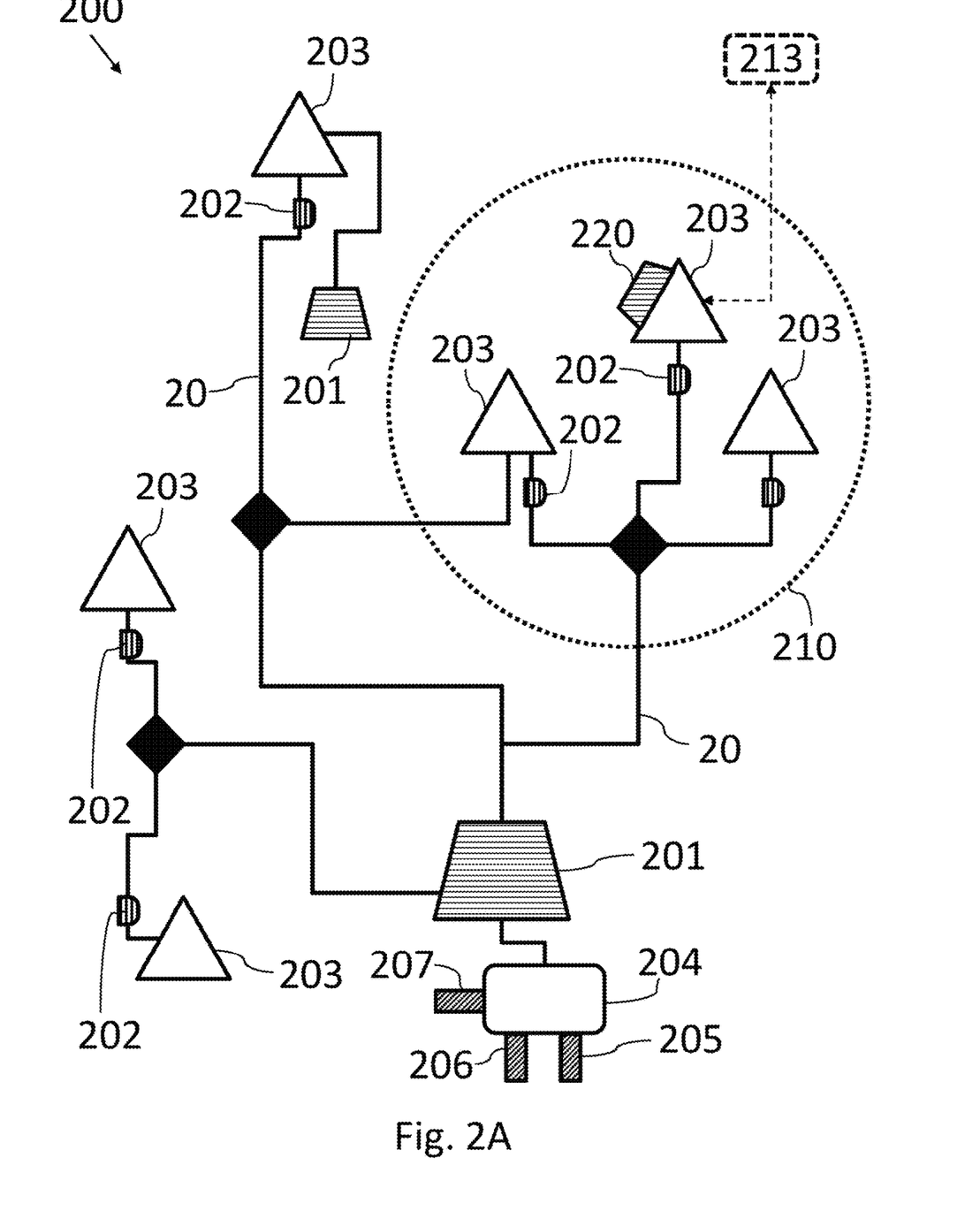
FIGS. 2A-2B show block diagrams of a power management system for managing power distribution in an electrical power grid, according to some embodiments of the invention.

Reference is now made to FIG. 2A, which shows a block diagram of a power management system 200 for managing power distribution in an electrical power grid, according to some embodiments. The power management system 200 may allow management of power distribution, for instance manage power consumption and/or power production, in at least a portion of an electrical power grid 20. Management of power consumption and/or power production may include automatic enforcement of change to power consumption and/or power production in a power grid (e.g., allocate all power produced in the power grid to a dedicated power storage instead of using for power consumption). The power grid 20 may include a plurality of nodes where at least one power storage facility 201 may be coupled to at least one node managed by the power management system 200. For instance, at least one power storage facility 201 may be coupled to a consumer (e.g., a household) that consumes electrical power, and/or the at least one power storage facility 201 may be coupled to a power production facility (e.g., a renewable energy device, such as solar panels).

The power management system 200 may include (e.g., smart) power consumption meters 202, to measure power consumption of at least one consumer 203 that is coupled thereto, so as to allow monitoring of the power consumption of consumers 203. In some embodiments, the power consumption meters 202 are configured to allow communication with at least one analysis computerized device 204 (or central processor). In some embodiments, the computerized device (or processor) 204 is a computing device 100 (such as shown in FIG. 1) with corresponding processing and memory elements configured to allow analyzing and processing of aggregated data from all consumers 203. In some embodiments, the power consumption meters 202 monitor power consumption of at least one electrical device of the consumers 203.

It should be noted that communication with the computerized device 204 may be carried out via a wireless network and/or via communication cables (for instance adjacent to electrical power grid 20). In some embodiments, different power consumption meters 202 communicate with the computerized device 204 via different networks, for instance a wired network and a cellular network.

According to some embodiments, the power management system 200 includes a dedicated power consumption database 205, operably coupled to the computerized device 204, including data for the at least one consumer 203. In some embodiments, each consumer 203 has a user profile indicating typical power consumption of that user, for instance based on previous power consumption records from the power consumption database 205. Thus, data received for that consumer 203 (e.g., from consumption meters 202) may be compared to the user profile in order to detect changes in power consumption. In some embodiments, the power consumption database 205 maintains information regarding time-based events (e.g., annual events, holidays, weekends, etc.), also referred to herein as calendar data, for example, when people are on national holiday, for instance, they may use more electrical devices compared to weekdays where people are usually at work during the day. In some embodiments, calendar data is stored in a separate dedicated database.

According to some embodiments, the computerized device 204 analyzes power consumption data from at least one power consumption meter 202 connected to the power grid 20, wherein the received power consumption data corresponds to consumption of the at least one consumer 203. In some embodiments, historical data may be analyzed as well.

In some embodiments, the power management system 200 includes a dedicated ambient condition database 206 and a renewable energy source database 207, operably coupled to the computerized device 204. For example, on a cold day, more heaters may be turned on, thereby increasing overall power consumption. The ambient condition database 206 may include information for weather conditions in a predefined geographical area 210 (indicated with a dashed line) corresponding to the electrical power grid 20. In some embodiments, weather data from ambient condition database 206 includes values corresponding to prospective or future production of electrical power from a renewable energy source. For example, specific solar illumination intensity may correspond to a known power production level with solar panels (e.g., determined during calibration). In some embodiments, the ambient condition database 206 includes information used for generation of a power production or power consumption forecast. It should be noted that, in an area having smart power consumption meters within a predetermined geographical zone, neighboring consumers may present similar power consumption behavior), such that these consumers may be grouped based on their power consumption, for instance grouped within a street, a portion of a street, a neighborhood or even within a city in order to consider the grouped consumers as a single cluster with substantially similar averaged power consumption for forecasting and managing power consumption in the grid.

According to some embodiments, the power management system 200 includes at least one power production facility 220 (e.g., solar panels) coupled to the power grid 20, such that saving power from the production facility 220 and by the power storage facility 201 may be managed by the power management system 200. For example, the computerized device 204 may analyze (e.g., using machine learning algorithms), for a particular time, the costs of consuming electrical power from the power grid 20 compared to predicted costs at a later time (e.g., during the night when costs are lower) and send a command to a controlling device that would cause consumption (e.g., automatically operate a washing machine at household of consumer 203) to consume power from the power grid 20 and/or consume power from the power storage facility 201 and/or consume power generated from the production facility 220 at particular time periods such that the costs of consuming electrical power may be lower.

In some embodiments, a user of the power grid 20, such as a consumer 203 and/or an owner of a production facility 220 and/or a community of households trying to manage their power consumption within a predetermined range (e.g., a self-sustained community), creates at least one power consumption rule 213 to be enforced on the power consumption. The at least one power consumption rule 213 may include parameters (e.g., for time, costs, power usage, etc.), or ranges of parameters, that when these parameters occur the at least one power consumption rule 213 may be enforced or applied to alter the power consumption. For example, enforcement of the at least one power consumption rule 213 cause a particular result when a predefined condition occurs. If at least one parameter occurs in the system (e.g., if power consumption exceeds a predefined threshold), then a predefined change to the power consumption is enforced. The at least one power consumption rule 213 may include preferences of the user of the power grid 20 for power consumption behavior, for instance preferences for dates or time periods in which certain electrical appliances need to operate and/or maximal cost of power consumption from the power grid 20 and/or minimal power to be stored by the power storage facility 201 from the production facility 220 (e.g., as some users may desire to reduce their "ecological footprint"). If the at least one power consumption rule 213 is enforced by the power management system 200, the power consumption by the user of the power grid 20 may be accordingly modified. For instance, if a first power consumption preference of the user of the power grid 20 is applied the power consumption may be modified by a particular selected action.

For example, the at least one power consumption rule 213 may include the user preferences for user defined life style or "comfort" (e.g., limiting minimal production facility charging rate, allowed flexibility of smart air conditioner temperature, etc.), and with increased flexibility on the "comfort" of the consumer (e.g., flexibility on ranges/thresholds of the at least one power consumption rule), the efficiency of the optimization of power consumption may be increased as well since there may be fewer restrictions on the optimization algorithm to reduce total costs.

According to some embodiments, the optimization algorithm may include a gradient search algorithm (or steepest descent algorithm). The gradient search algorithm may examine the status at each step all possible directions and chooses the direction with larger negative gradient, stopping at the local minimum (e.g., with minimum cost). For example, in the case of a nonlinear power production, paths may not be refined or analyzed since small change in the middle impacts the entire chain of events. In order to overcome computational complexity of the search algorithm, at least one of the following features may be introduced: "pruning of paths" to save only best N(t) paths for the next time; "post optimization refining" to partially evaluate pruned paths to check if they may lead to the better local minimum; and "price unification" to unify timestamps with similar electricity prices and thereby reduce substantially the number timestamps to optimize.

In some embodiments, the optimization algorithm may be used with a generated set of predefined actions for the system 200 with power production and/or power storage to minimize cost and/or maximize profit on the base of the consumption, production forecast and prices. For nonlinear power production, the gradient search driven algorithm may be used with pruning and/or refining. Thus, using the optimization algorithm, it may be possible to look up to for instance ten days ahead for optimal power storage operation windows in variable spot market environment.

The computerized device 204 may apply the at least one power consumption rule 213 on power consumption data that have been analyzed by the computerized device 204, for instance applying the rule based on forecasted power consumption and/or forecasted power production and/or forecasted energy price and/or data received from the power consumption database 205 and/or the ambient condition database 206 and/or the renewable energy source database 207. In some embodiments, the application of the at least one power consumption rule may be based on forecasted data. For example, if the at least one power consumption rule 213 states that for certain hours of the day the power consumption is to be carried out from the power storage facility 201 instead of being carried out from the power grid 20 in case that a threshold of power consumption costs is reached, then the rule may be applied on the analyzed power consumption data such that the power management system 200 may generate a recommendation (or result of the application of the at least one rule) for how to manage the power consumption in accordance with the preferences of the user (based on the at least one power consumption rule 213). In some embodiments, the at least one power consumption rule 213 includes preferences for power consumption based on the power capacity status of the at least one power storage facility 201, for instance if the at least one power storage facility 201 has less than forty percent capacity then the rule may indicate that power is to be consumed from the power grid 20.

In some embodiments, the power management system 200 automatically manages power consumption for the at least one consumer 203 within at least a portion of the power grid 20, based on the result of the application of the at least one power consumption rule 213, and also based on a power capacity status of the at least one power storage facility 201. Such management of power consumption produces optimization of power consumption that cannot be achieved by a human deciding on its own when and/or how to consume electrical power. For example, the power management system 200 may send instructions to electrical appliances and/or the at least one power storage facility 201 to consume power from the power grid 20.

In some embodiments, the power grid 20 (e.g., defined geographically or physically based on nodes location in the power grid) may be regarded as a separate (e.g., self-sustaining) system, and the computerized device 204 analyzes influence of managing power consumption for the at least one consumer 203 on power distribution of the entire power grid 20 and update the at least one power consumption rule 213 to maintain power distribution of the power grid 20 below a first predefined threshold of total power consumption. The first predefined threshold may be based on power consumption data from consumers 203 that are geographically adjacent to the at least one consumer 203 (e.g., within the geographical area 210).

It should be noted that while multiple elements of the power management system 200 shown in FIG. 2A, some of these elements may be omitted according to the requirements of the user of the system. In some embodiments, the management system 200 manages power consumption in at least a portion of the power grid 20 for at least one consumer 203 coupled to the at least one power storage facility 201. In some embodiments, the management system 200 manages power consumption in at least a portion of the power grid 20 for at least one consumer 203 coupled to the at least one power storage facility 201 and also coupled to the at least one production facility 220.

According to some embodiments, the management system 200 manages power consumption in at least a portion of the power grid 20 for at least one production facility 220 coupled to the at least one power storage facility 201, for instance a renewable energy power production facility that manages times when to store the power to the at least one power storage facility 201 and when to distribute the power to the power grid 20.

In some embodiments, the result of the application of the at least one power consumption rule is calculated based on a machine learning algorithm configured to increase power distribution of the power grid 20 towards a second predefined threshold. The machine learning algorithm may include a decision tree generated based on a consumer feedback loop.

In some embodiments, the computerized device 204 carries out at least one of: allocating power resources to the at least one power storage 201, retrieving power from the power grid 20, consuming power from the at least one power storage 201 instead of the power grid 20, and reallocating power resources to a different consumer 203 of the power grid 20.

Figure 2B:
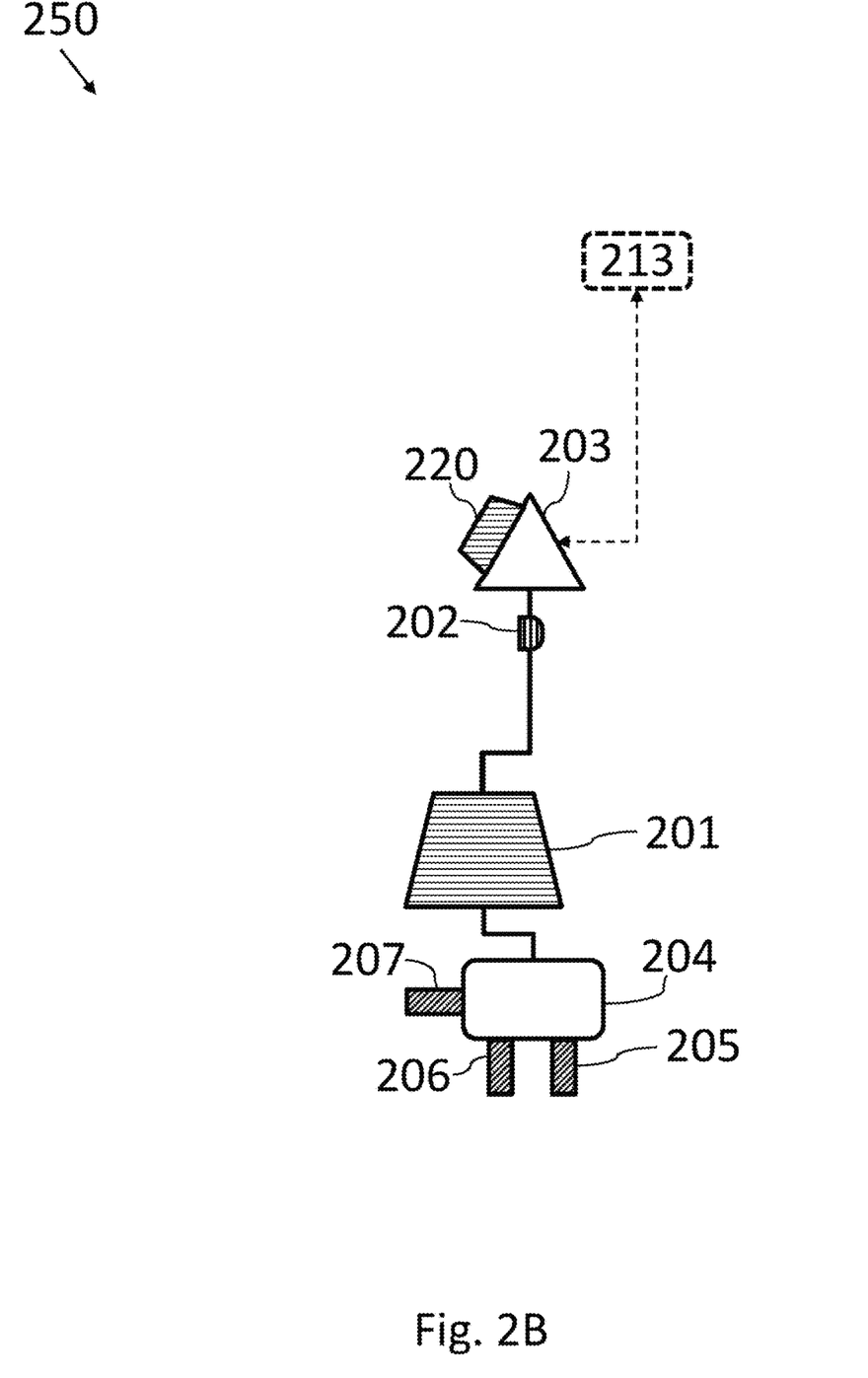

Reference is now made to FIG. 2B, which shows a block diagram of a power management system 250 for managing power distribution without an electrical power grid, according to some embodiments. The power management system 250 manages power consumption for at least one consumer 203 coupled to the production facility 220 and also coupled to the at least one power storage facility 201. It should be noted that in case a consumer 203 wishes to manage power (e.g., in a closed community or a farm) without any connection to a power grid, the power management system 250 may automatically manage power for the consumer 203 based on the result of the application of at least one power consumption rule 213. Such management of power consumption produces optimization of power consumption that cannot be achieved by a human deciding on its own when and/or how to consume electrical power.

In some embodiments, the computerized device 204 carries out at least one of: allocating power resources from the at least one power production facility to the at least one power storage, and allocating power resources from the at least one power production facility to the power grid.

Figure 3:
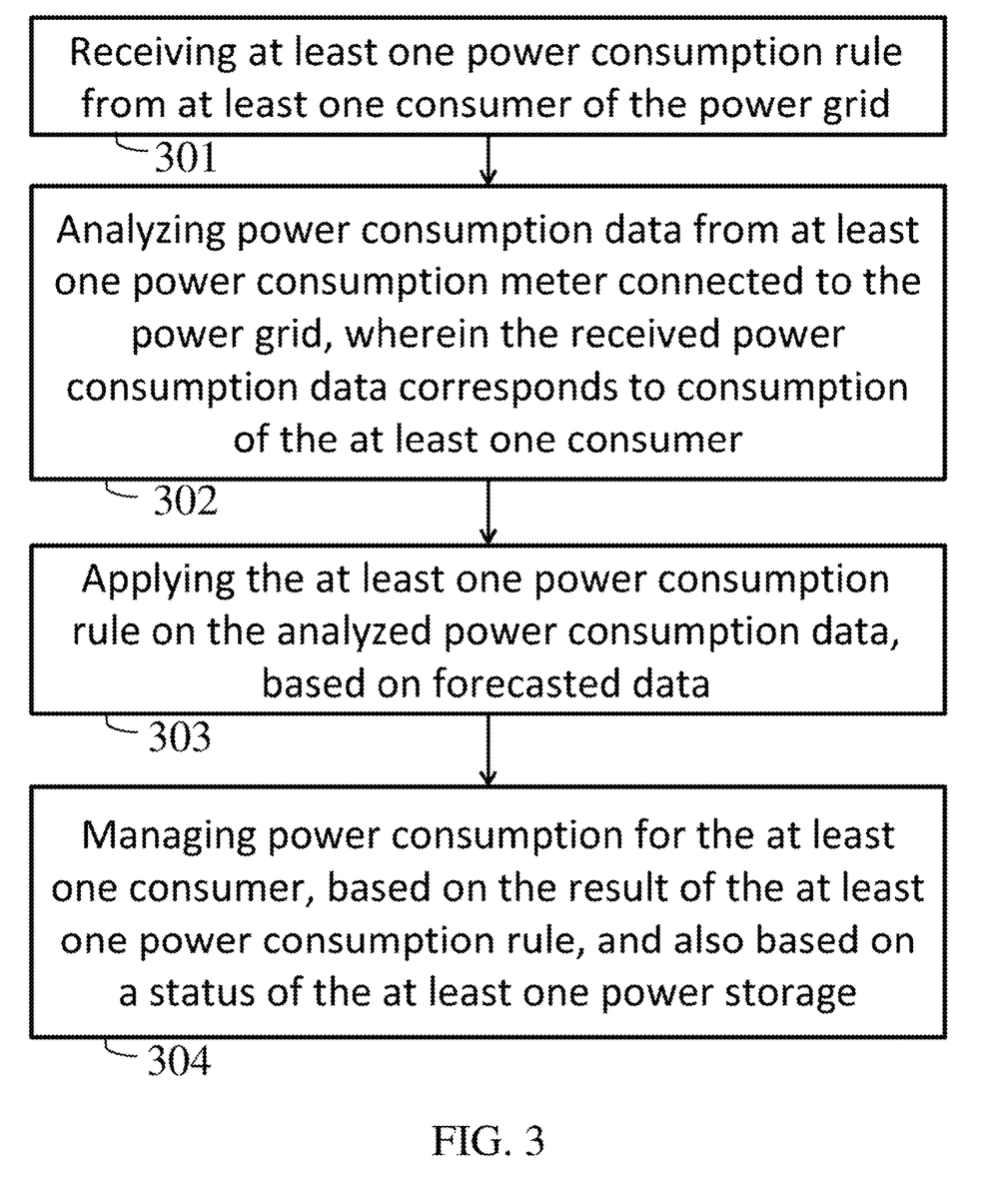
FIG. 3 which shows a flowchart of a method of managing power distribution in a portion of an electrical power grid, according to some embodiments of the invention.

Reference is now made to FIG. 3, which shows a flowchart of a method of managing power distribution in a portion of an electrical power grid 20, wherein the power grid 20 includes at least one power storage facility 201, according to some embodiments. At least one power consumption rule 213 may be received 213 from at least one consumer 203 of the power grid 20 such that power consumption data from at least one power consumption meter 202 connected to the power grid 20 may be analyzed 302 (e.g., by the computerized device 204), wherein the received power consumption data may correspond to consumption of the at least one consumer 203. In some embodiments, the at least one power consumption rule 213 is applied 303 on the analyzed power consumption data, for instance based on forecasted power consumption and/or forecasted power production and/or forecasted energy price such that power consumption is automatically managed 304 for the at least one consumer 203, based on the result of the application of the at least one power consumption rule 213, and also based on a power capacity status (e.g., empty or 70% full) of the at least one power storage facility 201. Such management of power consumption produces optimization of power consumption that cannot be achieved by a human deciding on its own when and/or how to consume electrical power. For example, upon analysis of the received power consumption data, the power management system may automatically distribute power between the power grid and/or the power storage facility and/or individual electric appliances with the washing machine may be automatically operated at night by the power management system.

Figure 4:
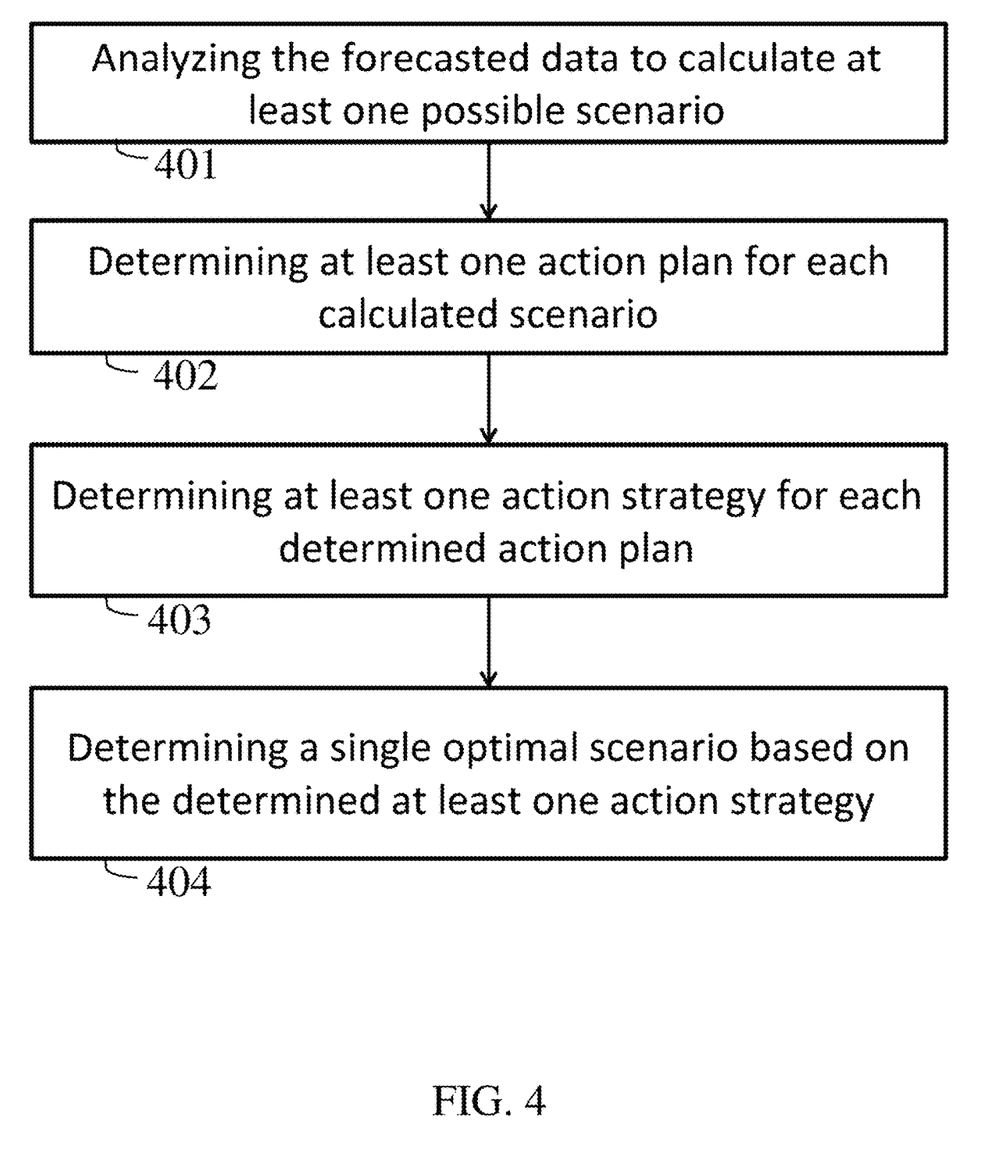
FIG. 4 shows a which shows a flowchart of a method of determining optimal power consumption scenario, according to some embodiments of the invention.

Reference is now made to FIG. 4, which shows a flowchart of a method of determining optimal power consumption scenario, according to some embodiments. The power management system may determine optimal management of power for the at least one consumer 203, taking as input at least one of forecasted power consumption and/or forecasted power production and/or forecasted energy costs. Multiple possible scenarios may be calculated based on the forecasted input and at least one (deterministic) action plan may be determined for each such scenario. The forecasted data may be analyzed 401 to calculate at least one possible scenario and determine 402 at least one action plan for each calculated scenario. At least one (conditional) action strategy may be determined 403 for each determined action plan, and a single optimal scenario may be determined 404 based on the determined at least one action strategy. For instance, a single optimal scenario may be determined using the at least one power consumption rule 213. In some embodiments, determination of the optimal scenario is carried out using a hidden Markov model and/or using a Monte-Carlo evaluator.

It should be noted that a power management system as described above may have an advantage for managing power over a plurality of consumers, compared to power consumption management for a single consumer (e.g., a single household). At least some of the reasons for the advantages may include: learning the relation between the user preferences (indicated in the at least one power consumption rule 213) and the corresponding effect on the power distribution within the power grid may be achieved faster when the learning is performed on multiple users, additionally a group of multiple users may share a common goal (e.g., reduce consumption from the power grid 20) and thereby automatically manage their power consumption based on that goal, with corresponding power consumption rules. Since most households may have common hardware (electrical infrastructure, appliances, solar panels, etc.), these consumers may share similar constraints and thereby benefit from a system that manages power for a plurality of consumers.

In some embodiments, a group of users/consumers working for a "common goal" shares power therebetween, for instance if at least one user of the group has a production facility 220 then other users may buy/sell power produced within the group instead of consuming power from the power grid 20.

In some embodiments, the power management system maintains power consumption within a predefined range in order to prevent sharp changes, for instance with a predefined set of rules for each power grid. For example, in case that electrical power price forecast indicates low prices the power management system may prevent all users consuming at the same time, thereby possibly damaging the power grid and/or cause increase of the price due to the high consumption.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of managing power distribution in a portion of an electrical power grid, wherein the power grid comprises at least one power storage, the method comprising:
   receiving at least one power consumption rule from at least one consumer of the power grid;
   analyzing power consumption data from at least one power consumption meter connected to the power grid, wherein the received power consumption data corresponds to consumption of the at least one consumer;
   receiving forecasted power consumption data;
   applying the at least one power consumption rule on the analyzed power consumption data, wherein the application of the at least one power consumption rule is also based on forecasted data, wherein the forecasted data is selected from the group consisting of: forecasted power consumption, forecasted power production and forecasted energy prices; and
   managing power consumption for the at least one consumer, based on the result of the at least one power consumption rule, and also based on a power capacity status of the at least one power storage, wherein the result of the at least one power consumption rule is calculated based on a machine learning algorithm configured to increase power distribution of the power grid towards a second predefined threshold.

2. The method of claim 1, wherein the operation of power consumption management is selected from the group consisting of: allocating power resources to the at least one power storage, retrieving power from the power grid, consuming power from the at least one power storage instead of the power grid, and reallocating power resources to a different consumer of the power grid.

3. The method of claim 1, wherein management of the power consumption comprises consuming power by an electrical appliance connected to the power grid.

4. The method of claim 1, wherein the power grid further comprises at least one power production facility, and wherein the operation of power consumption management comprises at least one of: allocating power resources from the at least one power production facility to the at least one power storage, and allocating power resources from the at least one power production facility to the power grid.

5. The method of claim 1, further comprising: analyzing influence of operations for managing power consumption for the at least one consumer on power distribution of the power grid; and
updating the at least one power consumption rule to maintain power distribution of the power grid below a first predefined threshold.

6. The method of claim 5, wherein the first predefined threshold is based on power consumption data from consumers that are geographically adjacent to the at least one consumer.

7. The method of claim 1, wherein the machine learning algorithm comprises a decision tree generated based on a consumer feedback loop.

8. The method of claim 1, further comprising:
analyzing the forecasted data to calculate at least one possible scenario; determining at least one action plan for each calculated scenario; determining at least one action strategy for each determined action plan; and
determining a single optimal scenario based on the determined at least one action strategy.

9. The method of claim 8, wherein the at least one action plan is deterministic.

10. The method of claim 8, wherein the at least one action strategy is conditional.

11. The method of claim 8, wherein the single optimal scenario is determined based on the at least one power consumption rule.

12. The method of claim 8, wherein the single optimal scenario is determined based on at least one of hidden Markov model and a Monte-Carlo evaluator.

13. A system for managing power distribution in an electrical power grid, wherein the power grid comprises at least one power storage, the system comprising:
at least one power consumption meter connected to the power grid; and
a processor, coupled to the at least one power consumption meter, and configured to:
receive at least one power consumption rule from at least one consumer of the power grid;
analyze power consumption data from at least one power consumption meter, wherein the received power consumption data corresponds to consumption of the at least one consumer;
apply the at least one power consumption rule on the analyzed power consumption data, based on forecasted data wherein the forecasted data is selected from the group consisting of: forecasted power consumption—forecasted power production, and forecasted energy prices; and
manage power consumption for the at least one consumer, based on the result of the at least one power consumption rule, and also based on a power capacity status of the at least one power storage, wherein the result of the at least one power consumption rule is calculated based on a machine learning algorithm configured to increase power distribution of the power grid towards a second predefined threshold.

14. The system of claim 13, wherein for the operation of power consumption management the processor is configured to carry out at least one of: allocate power resources to the at least one power storage, retrieve power from the power grid, consume power from the at least one power storage instead of the power grid, and reallocate power resources to a different consumer of the power grid.

15. The system of claim 13 wherein the power grid further comprises at least one power production facility, and wherein for the operation of power consumption management the processor is configured to carry out at least one of: allocate power resources from the at least one power production facility to the at least one power storage, and allocate power resources from the at least one power production facility to the power grid.

16. A method of managing power distribution of at least one electrical power production facility coupled to at least one power storage, the method comprising:
receiving at least one power consumption rule from at least one consumer of the at least one electrical power production facility;
analyzing power consumption data from at least one power consumption meter connected to the at least one electrical power production facility, wherein the received power consumption data corresponds to consumption of the at least one consumer;
applying the at least one power consumption rule on the analyzed power consumption data, based on forecasted data wherein the forecasted data is selected from the group consisting of: forecasted power consumption—forecasted power production, and forecasted energy prices; and
managing power consumption for the at least one consumer, based on the result of the at least one power consumption rule, and also based on a power capacity status of the at least one power storage, wherein the result of the at least one power consumption rule is calculated based on a machine learning algorithm configured to increase power distribution of the power grid towards a second predefined threshold.

17. The method of claim 16, wherein the operation of power consumption management is selected from the group consisting of: allocating power resources from the at least one power production facility to the at least one power storage, consuming power from the at least one power storage, and reallocating power resources to a different consumer of the power grid.

18. The method of claim 16, further comprising:
analyzing the forecasted data to calculate at least one possible scenario; determining at least one action plan for each calculated scenario; determining at least one action strategy for each determined action plan; and
determining a single optimal scenario based on the determined at least one action strategy.

19. The method of claim 18, wherein the single optimal scenario is determined based on at least one of hidden Markov model and a Monte-Carlo evaluator.

* * * * *